United States Patent
Gomanne et al.

(10) Patent No.: US 10,458,422 B2
(45) Date of Patent: Oct. 29, 2019

(54) TURBINE ENGINE PROVIDED WITH A LUBRICATION UNIT

(71) Applicant: Safran Aircraft Engines, Paris (FR)

(72) Inventors: Benoît Jean Henri Gomanne, Moissy-Cramayel (FR); Michel Gilbert Roland Brault, Moissy-Cramayel (FR); Thomas Chauveau, Moissy-Cramayel (FR); Bellal Waissi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 372 days.

(21) Appl. No.: 15/116,183

(22) PCT Filed: Feb. 5, 2015

(86) PCT No.: PCT/FR2015/050282
§ 371 (c)(1),
(2) Date: Aug. 2, 2016

(87) PCT Pub. No.: WO2015/118271
PCT Pub. Date: Aug. 13, 2015

(65) Prior Publication Data
US 2017/0009776 A1 Jan. 12, 2017

(30) Foreign Application Priority Data
Feb. 7, 2014 (FR) ...................................... 14 50973

(51) Int. Cl.
*F01D 25/20* (2006.01)
*F04D 29/063* (2006.01)
(Continued)

(52) U.S. Cl.
CPC ........... *F04D 29/063* (2013.01); *F01D 25/20* (2013.01); *F02C 7/06* (2013.01); *F04C 2/102* (2013.01);
(Continued)

(58) Field of Classification Search
CPC .... F01D 25/20; F04C 15/0061; F04D 29/063; F02C 7/06
See application file for complete search history.

(56) References Cited

U.S. PATENT DOCUMENTS 8,215,895 B2 * 7/2012 Henry ..................... F01D 9/065
415/1
10,082,077 B2 * 9/2018 Denman ................... F02C 7/06
(Continued)

FOREIGN PATENT DOCUMENTS

EP 1 396 639 A1 3/2004
GB 1 558 489 A 1/1980
(Continued)

OTHER PUBLICATIONS

Written Opinion of the International Searching Authority dated May 28, 2015, issued in corresponding International Application No. PCT/FR2015/050282, filed Feb. 5, 2015, 5 pages.
(Continued)

*Primary Examiner* — Woody A Lee, Jr.
(74) *Attorney, Agent, or Firm* — Christensen O'Connor Johnson Kindness PLLC

(57) ABSTRACT

A turbine engine includes two rotary shafts and a lubrication unit. The lubrication unit has at least one pump which a casing inside of which a rotor is mounted and driven by one of the rotary shafts. The pump casing is rotated by the other rotary shaft such that the actuation of the pump depends on the difference between rotational speeds of the shafts. The shafts are a drive shaft and a fan shaft, respectively, wherein
(Continued)

the fan shaft is driven by the drive shaft by means of a reduction gear which is lubricated by the lubrication unit. The reduction gear is annular and the pump passes axially therethrough.

8 Claims, 3 Drawing Sheets

(51) Int. Cl.
*F02C 7/06* (2006.01)
*F04C 2/10* (2006.01)
*F04C 15/00* (2006.01)
*F04D 3/00* (2006.01)
*F04D 13/02* (2006.01)
*F04D 25/02* (2006.01)
*F04D 29/053* (2006.01)
*F04D 29/52* (2006.01)

(52) U.S. Cl.
CPC .......... *F04C 15/0061* (2013.01); *F04D 3/005* (2013.01); *F04D 13/028* (2013.01); *F04D 25/028* (2013.01); *F04D 29/053* (2013.01); *F04D 29/522* (2013.01); *F05B 2220/30* (2013.01); *F05B 2260/98* (2013.01); *F05D 2260/40311* (2013.01); *Y02T 50/671* (2013.01)

(56) References Cited

U.S. PATENT DOCUMENTS

| | | | |
|---|---|---|---|
| 2007/0157596 A1* | 7/2007 | Moniz | F01D 25/164 60/39.162 |
| 2016/0237899 A1* | 8/2016 | Denman | F01D 25/20 |
| 2017/0067367 A1* | 3/2017 | Wojcik | F01D 25/20 |

FOREIGN PATENT DOCUMENTS

| | | | | |
|---|---|---|---|---|
| GB | 1558489 A | * | 1/1980 | ........ F16H 57/043 |
| GB | 2 160 291 A | | 12/1985 | |
| GB | 2160291 A | * | 12/1985 | |
| WO | 2013124590 A1 | | 8/2013 | |

OTHER PUBLICATIONS

International Preliminary Report on Patentability dated Aug. 9, 2016, issued in corresponding International Application No. PCT/FR2015/050282, filed Feb. 5, 2015, 1 page.

International Search Report dated May 28, 2015, issued in corresponding International Application No. PCT/FR2015/050282, filed Feb. 5, 2015, 5 pages.

Written Opinion issued in corresponding International Application No. PCT/FR2015/050282, filed Feb. 5, 2015, 5 pages.

* cited by examiner

TURBINE ENGINE PROVIDED WITH A LUBRICATION UNIT

TECHNICAL FIELD

Embodiments of the present disclosure relate to a turbine engine provided with a lubrication unit.

BACKGROUND

A turbine engine generally has several compressor stages, in particular a low-pressure (LP) compressor and a high-pressure (HP) compressor which belong to the main body of the engine. Upstream of the low-pressure compressor is arranged a movable-blade wheel of large dimensions, or fan, which feeds both the primary flow which passes through the LP and HP compressors and the cold flow, or secondary flow, which is directed directly towards a cold flow nozzle, referred to as a secondary nozzle. The fan is driven by the rotary shaft of the LP body and generally turns at the same speed as the shaft. However, it may be advantageous to make the fan turn at a rotational speed of less than that of the drive shaft or LP shaft, in particular when the fan has very large dimensions, for the purpose of adapting it better aerodynamically. For this purpose, a reduction gear is arranged between the LP shaft and a fan shaft which carries the fan.

Among the types of reduction gears used there are reduction gears having an epicyclic gear train, which have the advantage of offering considerable rates of reduction of the rotational speed, in a reduced space. These reduction gears are characterized by satellite type planet pinions which roll on an external ring gear and rotate about satellite axes borne by a planet carrier. For reasons of space required and weight, it is advantageous to make the satellites rotate on their shafts by means of hydrodynamic plain bearings. These bearings necessitate continuous lubrication, otherwise they deteriorate quickly, with all the consequences that this may have on the operation of the engine and the safety of the aircraft. Thus difficulties arise in terms of operational safety, and therefore it is necessary for precautionary measures to be taken against breakdown, such as for example locking of the reduction gear or autorotation of the fan wheel (commonly referred to as windmilling). In fact as the HP body and the LP body are decoupled, it is possible for the LP body and the fan to turn while the rotational speed of the HP body is uncertain.

In the current technology, the reduction gear is lubricated by a lubrication unit actuated by an accessory gear box (AGB) which is generally mounted in the nacelle compartment of the propulsion assembly. This accessory gear box comprises power take-off means on the engine of the turbine engine, by means of a radial shaft which is coupled to the HP body. In the event of windmilling, the HP body does not turn and the lubrication unit is not active whilst the plain bearings of the reduction gear must always be lubricated.

Therefore, there is a need for pumping the oil for lubrication of the reduction gear, in particular when the engine is stopped. In order to meet this need, it has already been proposed to equip the turbine engine with a standby pump for lubricating the reduction gear in such a way that the reduction gear can still be lubricated, even when the HP body is stopped. In this case, it is necessary to add a power take-off on the fan or a power supply circuit in order to actuate this pump. It can also raise problems of overall size, of mass and of service life. Thus the introduction of this pump has the drawback that it complicates the architecture of the engine and contradicts the desired objective of compactness and weight reduction.

The present disclosure provides a simple, effective and economical solution to at least some of the problems of the prior art.

SUMMARY

The disclosure proposes a turbine engine including two rotary shafts and a lubrication unit comprising at least one pump which comprises a casing inside of which a rotor is mounted and driven by one of the shafts, the pump casing being rotated by the other of the shafts such that the actuation of the pump depends on the difference between rotational speeds of the shafts, characterized in that the shafts are a drive shaft and a fan shaft, respectively, the fan shaft being driven by the drive shaft by means of a reduction gear which is lubricated by the lubrication unit, and in that the reduction gear is annular and the pump passes axially therethrough.

Thus the disclosure proposes a new type of integration of a lubrication pump into a turbine engine, of which the casing and the rotor are both rotated at different speeds not equal to zero, the actuation of the pump resulting from the difference between these speeds.

According to a characteristic of the disclosure, the rotary shafts are coaxial. The casing of the pump is preferably mounted coaxially with the shafts. The pump can be at least partially accommodated inside one of the shafts which are generally tubular. The reduction gear is annular. The pump passes axially through this reduction gear. Thus, the pump is relatively compact and occupies a volume which was available in the prior art.

According to embodiments of the disclosure, the shafts are a drive shaft and a fan shaft, respectively, the fan shaft being driven by the drive shaft or LP shaft by means of a reduction gear which is lubricated by the lubrication unit. Thus, the pump is actuated even with the engine stopped. For example, in the event of windmilling, the fan continues to turn and the difference in speeds between the fan and the drive shaft makes it possible to actuate the pump and therefore to lubricate the reduction gear. Moreover, the power which enables the pump for lubricating the reduction gear to be driven mechanically is taken off as close as possible to the reduction gear, which is advantageous for safety reasons (in the event of breakage of the LP shaft between the turbine and the compressor, for example).

The amount of lubricating oil required by the reduction gear in the event of windmilling is generally only approximately 10% of the amount of oil required at rated speed, which can be obtained with a pump which is relatively compact and therefore can be easily installed in the vicinity of the reduction gear.

The pump casing can be coupled to the drive shaft or to the fan shaft, for example by means of splines. This coupling may be direct or by means of a part of the reduction gear such as the input ring gear thereof or the output shaft thereof. In fact, the casing of the pump may comprise splines engaging with splines of complementary shape on the drive shaft (or of the input ring gear of the reduction gear constrained to rotate with the drive shaft) or of the fan shaft (or of the output shaft constrained to rotate with the fan shaft).

The pump may be of the type having blades or a gerotor. The patent applications EP 0 736 691 A1 and EP 1 396 639 A1 describe volumetric pumps of the type having a gerotor.

The rotor of the pump can be driven by one of the shafts by means of an internally or externally toothed ring gear. The use of an internally toothed ring gear enables the drive shaft and the fan shaft to turn in the same direction. Thus this solution makes it possible to maintain the direction of rotation of the shafts and to allow a low rotational speed between the rotor and the casing of the pump (a low rotational speed makes it possible to provide a more reliable pump with low sliding speeds in the case of a pump having a gerotor). Thus, using an internally toothed ring gear makes it possible to change the direction of rotation and to allow a higher rotational speed between the rotor and the casing of the pump (with an equal need for lubrication, the high speed makes it possible to provide a more compact pump). In conclusion, on the input gear for driving the pump, the technology of this pump could be adapted depending on the engine requirements.

As a variant or as an additional characteristic, the rotor of the pump can be driven by one of the shafts by means of a coupling system intended to ensure coupling solely below a predetermined rotational speed of the shaft. This makes it possible to couple the rotor of the pump to the drive shaft (such as the LP shaft) solely when the rotational speed of this shaft is low. Thus the pump is used as a standby pump for lubricating the reduction gear in the event of windmilling. However, in normal operation of the turbine engine the pump can be used for continuously lubricating the reduction gear.

The rotor of the pump can comprise a shaft which carries at least one internal gerotor pinion engaging with an internally toothed ring gear which is movable in rotation in the casing of the pump.

Preferably, the axis of rotation of the pump rotor shaft is fixed within the reference system of the casing of the pump.

The pump advantageously has an elongated shape, and is for example substantially cylindrical.

Embodiments of the present disclosure also relate to a torque transmission system for a turbine engine, including two rotary shafts coupled together by a reduction gear having an epicyclic gear train, the system comprising a lubrication unit comprising at least one pump which comprises a casing inside of which a rotor is mounted and driven by one of the shafts, the pump casing being rotated by the other of the shafts such that the actuation of the pump depends on the difference between rotational speeds of the shafts, characterized in that the shafts are a drive shaft and a fan shaft, respectively, the fan shaft being driven by the drive shaft by means of a reduction gear which is lubricated by the lubrication unit, and in that the reduction gear is annular and the pump passes axially therethrough.

The pump can be intended for lubricating the reduction gear and can be regarded as integrated in the transmission system. This makes it possible to provide a transmission and pump assembly which offers a certain advantage of being autonomous with respect to its lubricating oil power supply.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
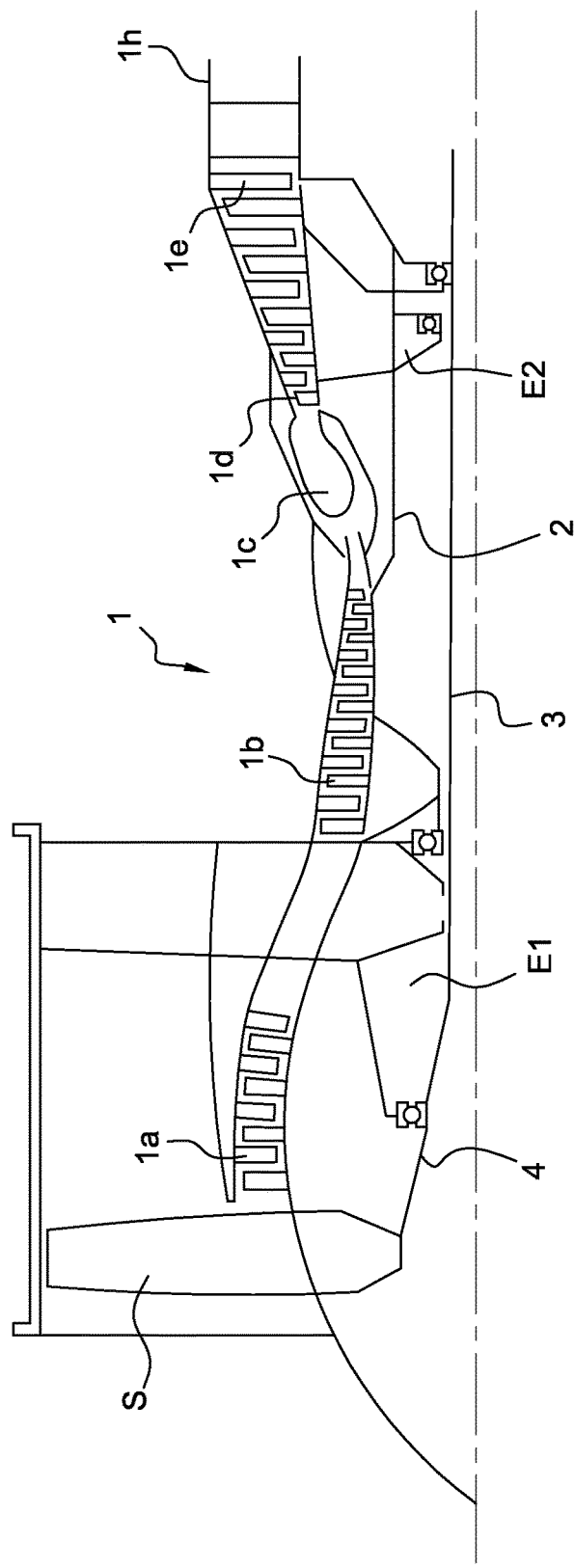
FIG. 1 is a very schematic half-view of a turbine engine.

With reference to FIG. 1, a turbine engine 1 of the turbojet engine type is shown which, in a conventional manner, includes a fan S, a low-pressure compressor 1a, a high-pressure compressor 1b, a combustion chamber 1c, a high-pressure turbine 1d, a low-pressure turbine 1e and an exhaust pipe 1h.

The high-pressure compressor 1b and the high-pressure turbine 1d are connected by a high-pressure shaft 2 and form a high-pressure (HP) body therewith. The low-pressure compressor 1a and the low-pressure turbine 1e are connected by a low-pressure shaft 3 and form a low-pressure (LP) body therewith.

In the configuration shown, which relates to a conventional turbojet engine without a reduction gear, the disc on which the blades of the fan S are mounted is driven by a fan shaft 4, or LP journal, which is itself driven directly by the LP shaft 3. In the event that a reduction gear is positioned between the LP shaft 3 and the fan shaft 4, this gear is, in a known manner, a reduction gear having an epicyclic gear train.

Figure 2:
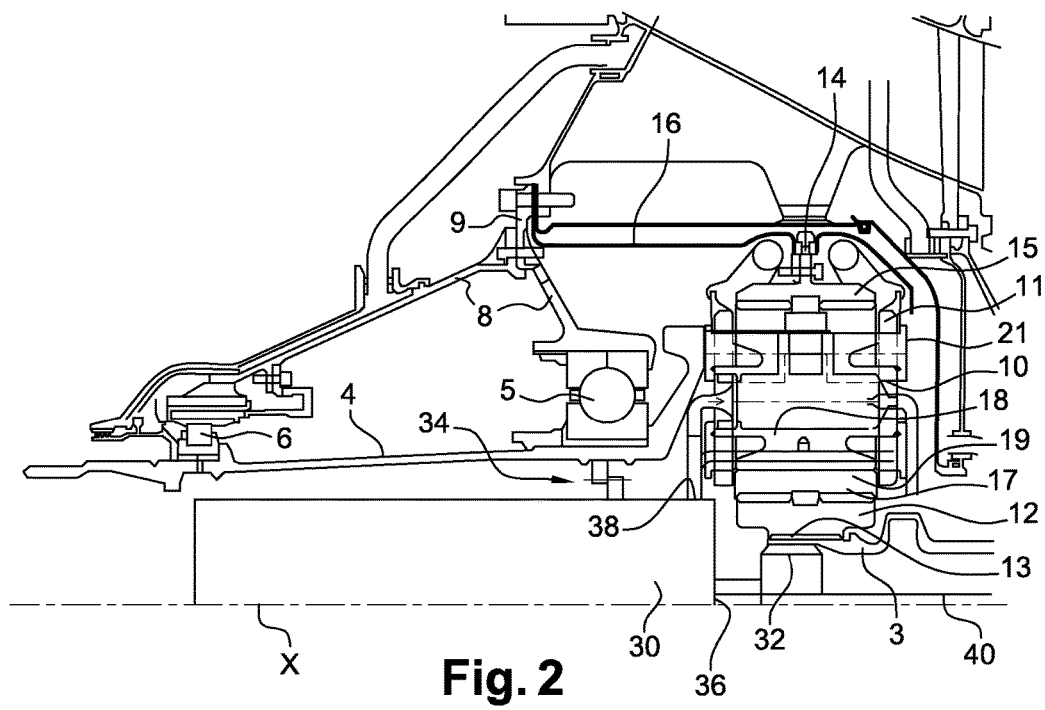
FIG. 2 is a partial schematic half-view of a turbine engine according to the disclosure and shows the integration of a lubrication pump of a reduction gear for reducing the rotational speed of the fan shaft of the turbine engine.

FIG. 2 shows the positioning commonly used for the installation of the reduction gear 10 in the front part of the turbojet engine. The blades of the fan S are supported by the fan shaft 4 which is connected to the structure of the engine by means of a ball bearing 5 which transmits the thrust forces, and a roller bearing 6 which allows the longitudinal expansions of the fan shaft.

The supporting elements of these two bearings 5, 6 are fixed on one or more parts forming a support 8 for the fan shaft 4, which is fastened to the structure of the turbojet engine in the region of a supporting flange of the fan module 9. The fan shaft 4 which, with the support part 8, the blades of the fan S and the two bearings 5 and 6, belongs to the fan module is fixed at its downstream end on the planet carrier 11 of the reduction gear 10. For its part, the LP shaft 3 is connected to the planetary gear 12 of the reduction gear 10 by splines 13.

The reduction gear 10 is fixed, by means of closure and support flanges 14 which extend radially from the ring gear 15 of the epicyclic gear train, to one of the ends of a support casing 16, which thus ensures that the reduction gear is held in place on the fan shaft 4 and ensures the position thereof with respect to the LP shaft 3.

The reduction gear engages, on the one hand, on the splines 13 of the LP shaft 3 by means of gear pinions of the planetary gear 12 of the epicyclic gear train, and, on the other hand, on the fan shaft 4 which is fastened to the planet carrier 11 of this same epicyclic gear train. Conventionally, the planet pinion 12, of which the axis of rotation is merged with the axis of rotation X of the turbojet engine, drives a series of satellite type planet pinions 17 which are distributed regularly over the circumference of the reduction gear. These satellites 17 also turn about the axis X of the turbojet engine, travelling on the ring gear 15 which is fastened to the structure of the turbojet engine by the support casing 16. Positioned at the centre of each satellite is a satellite shaft 18 connected to the planet carrier 11, the satellite turning freely about this shaft with the aid of a plain bearing 19, the reliability of operation of which is the subject of the disclosure. The rotation of the satellites about their shafts 18, due to the engagement of the pinions thereof with those of the ring gear 15, results in the rotation of the planet carrier 11 about the axis X, and consequently that of the fan shaft 4 which is connected thereto, at a rotational speed which is less than that of the LP shaft 3.

Driving the fan shaft 4 by the planet carrier 11 is ensured by a series of centring lugs 20, distributed regularly over the circumference of the reduction gear, which extend axially from the downstream end of the fan shaft 4 and which are pressed into bores produced in the planet carrier 11. The planet carrier 11 extends symmetrically on both sides of the reduction gear 10 in order to close the assembly and to form a compartment in which a lubrication function is performed. Bushings 21 complete the closure of this compartment by sealing it in the region of the satellite shafts 18, on each side of the reduction gear 10.

As described above, the lubrication of the reduction gear 10 is ensured by a lubrication unit which is actuated by the accessory gear box of the AGB type of the turbojet engine. When the engine is stopped but the fan shaft 4 continues to turn (windmilling), the lubrication of the reduction gear 10 should be ensured in order to avoid a deterioration of the plain bearings 19 thereof. Thus a supplementary emergency pump is used in the prior art in order to ensure the lubrication of the reduction gear 10 in the event of stoppage of the engine. The present disclosure proposes a novel technology which in particular facilitates the integration of this type of pump into a turbojet engine.

According to the disclosure, the emergency lubrication pump has a casing driven by a first shaft of the turbojet engine and a rotor mounted inside the casing and driven in rotation by a second shaft of the turbojet engine, which turns at a different speed from the first shaft in such a way that the actuation of the pump results from the difference in speed between the shafts.

FIG. 2 shows an example of integration of a pump 30 of this type in a turbojet engine of the aforementioned type. The pump 30 has an elongated shape, for example substantially cylindrical, the elongation axis thereof being substantially merged with the axis X in such a way that the shafts 3, 4 and the pump 30 are substantially coaxial.

In the illustrated example, the pump 30 extends inside the fan shaft 4 and an upstream end part of the LP shaft 3. The reduction gear 10 is mounted around this upstream end part of the LP shaft 3 and thus a part of the pump 30 passes therethrough.

The volume occupied by the pump 30 was available in the prior art. This substantially cylindrical volume has for example a length of 480 mm and a radius of 60 mm in a specific case. Therefore installation of a lubricating oil pump in this volume is clearly conceivable. A pump of which the dimensions would enable it to be mounted in the aforementioned volume could for example supply a flow of oil of 4200 l/h at 3500 rpm and 600 l/h at 800 rpm.

One of the elements among the rotor and the casing of the pump 30 is coupled by appropriate means 32 to the LP shaft 3 or to a part constrained to rotate with this shaft, such as the planetary gear 12 of the reduction gear 10, and the other element of the pump is coupled by appropriate means 34 to the fan shaft 4 or to a part constrained to rotate with this shaft, such as an output shaft of the reduction gear which is connected to the planet carrier 11.

The coupling means 32, 34 may be fastening means, a pinion gear or sets of splines for example. Each element (rotor or casing) of the pump can for example include splines engaged in complementary splines of a shaft or of a drive part.

The pump 30 comprises an oil inlet 36 and an oil outlet 38. In the illustrated example, oil is conveyed to the pump 30 from downstream of the turbojet engine by a pipe 40 which passes radially through the exhaust casing then axially, from downstream to upstream, through the LP shaft and is connected by means of a turning joint, of the OTB (Oil Transfer Bearing) type for example, to the oil inlet 36 of the pump.

The oil outlet 38 of the pump could be connected to oil injection means in the reduction gear 10 by means of a turning joint of the OTB type. Nevertheless, in the illustrated example the pump casing is rigidly connected to or housed in the fan shaft 4. Therefore there is more need for an OTB in order to connect the oil outlet of the pump to the planet carrier 11 of the reduction gear 10. A simple pipe connects the outlet of the pump to the cavities in the planet carrier. The lubricating oil arrives in these cavities which are arranged inside each satellite shaft. The connections between the satellites and the planet carrier 11 are plain bearings lubricated by means of the pump. The oil is conveyed without OTB inside the satellite shafts. This creates the advantage of no longer having an OTB. The exterior of the shaft of the satellite has grooves which make it possible to create a film of oil. A high oil pressure is supplied in order to create this supporting film of oil, which enables the planet carrier to turn on its shaft without friction. This oil, given the quantity supplied, is sufficient in order then to lubricate and above all to discharge the calories generated by the teeth of the satellites in contact with the teeth of the ring gear 15 and of the central planetary gear 12. The oil reaches the teeth by passing through the upstream and downstream faces of the satellites or through radial holes provided in the satellites.

In this embodiment of the lubrication of the epicyclic gear train, the transmission may have no supplementary lubrication system since all the parts are lubricated. Because of the proximity of the pump with the train and the restricted number of kinematic assemblies, the lubrication of the transmission by this system alone appears to be sufficiently reliable.

The pump 30 may be a pump of the type having blades or a gerotor. These types of pump are well known to the person skilled in the art. The patent applications EP 0 736 691 A1 and EP 1 396 639 A1 describe for example volumetric pumps of the type having a gerotor.

Figure 3:
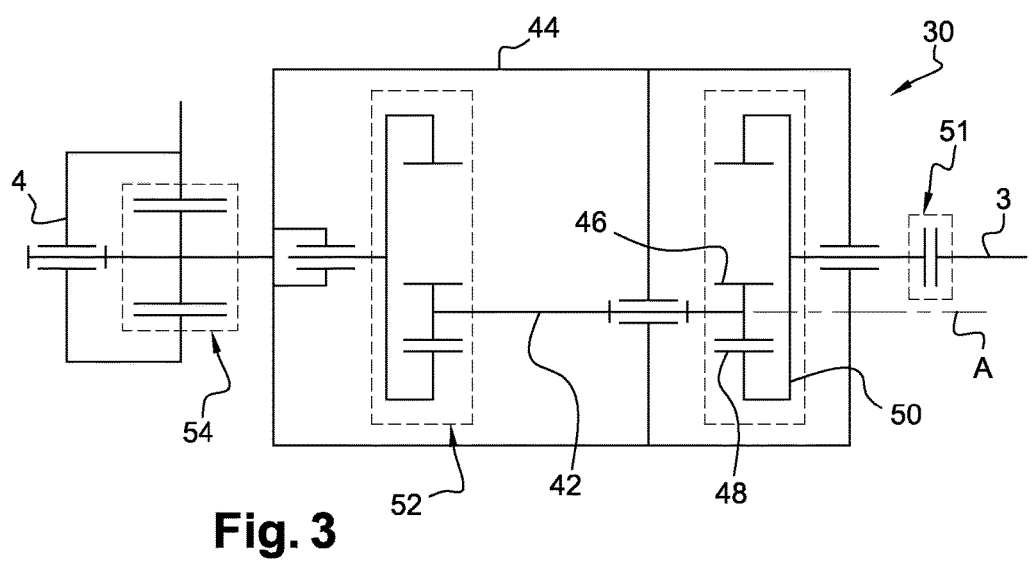
FIG. 3 is a very schematic view of a lubrication pump for a turbine engine according to the disclosure.

FIG. 3 shows in a very schematic manner a pump 30 having blades or a gerotor, which pump can be integrated into a turbojet engine.

With reference to FIG. 3, the pump 30 comprises a shaft 42 which is centred and guided in rotation in the pump casing 44 in such a way that its axis of rotation A is immobile within the reference system of the casing 44 (the position of the shaft 42 is thus fixed in relation to the casing 44). This solution makes it possible to synchronize the movement of the casing and therefore the oil inlet and outlet with respect to the rotor shaft which ensures the pumping of the oil, enabling effective functioning of the pump.

The shaft 42 comprises a pinion 46 engaged with an internal toothing 48 of a ring gear 50 coupled by appropriate means 51 to one of the shafts, such as the LP shaft 3, and likewise comprises means 52 for driving at least one gerotor pinion or at least one rotor having blades, which is intended to engage with the pump casing 44 or with a ring gear mounted in this casing, for the pumping of oil, as will be described in greater detail below.

The use of the ring gear 50 having internal toothing 48 enables the shaft 42 of the pump to turn in the same direction as the LP shaft. As a variant, in the case where the pinion 46 is engaged with an external toothing of a ring gear 50 coupled to the LP shaft 3, the pump shaft 42 and the LP shaft 3 would turn in opposing directions.

Moreover, the use of a pinion 46 is advantageous since the number of teeth thereof can be determined in order to optimize the relative rotational speeds of the shafts 42, 3.

The pump casing 44 is coupled by appropriate means 54 to the other shaft, in this case the fan shaft 4.

Figure 4:
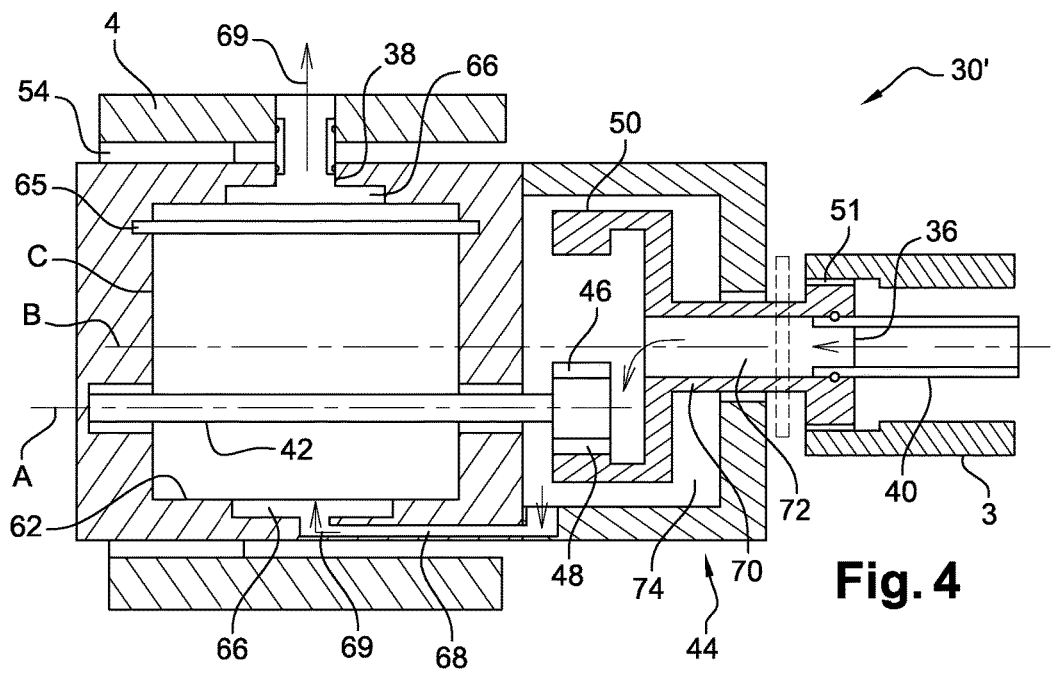
FIG. 4 is a schematic axial sectional view of a lubrication pump for a turbine engine according to the disclosure.

FIG. 4 shows in greater detail a lubrication pump 30' particularly well adapted to be installed in the aforementioned environment.

The elements of the pump 30' already described above are described here using the same references. Thus the pump 30' of FIG. 4 comprises a shaft 42 which is centred and guided in rotation in the pump casing 44 about an axis A and of which the relative position is fixed in relation to this casing 44. The shaft 42 comprises a pinion 46 engaged with the internal toothing 48 of a ring gear 50 coupled by coupling means 51 to the LP shaft 3.

Figure 5:
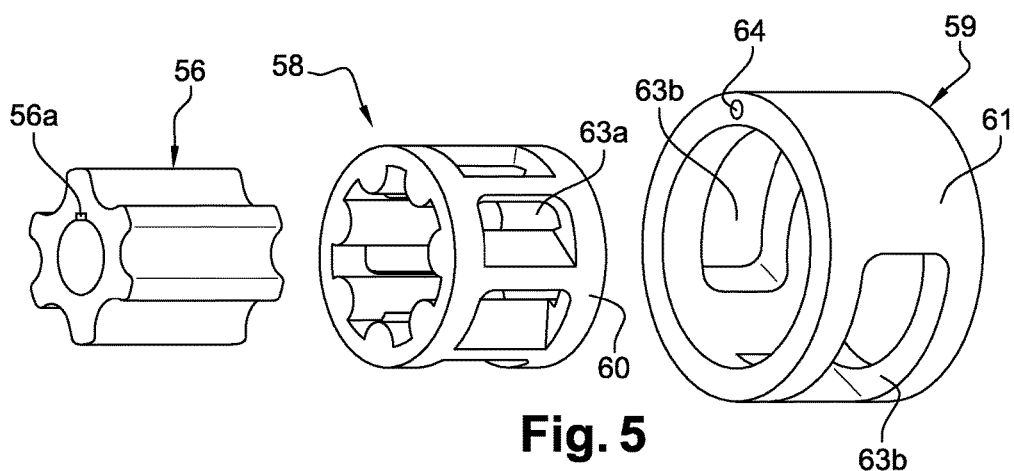
FIGS. 5 and 6 are very schematic views of lubrication pumps respectively having a gerotor and blades.
Figure 6:
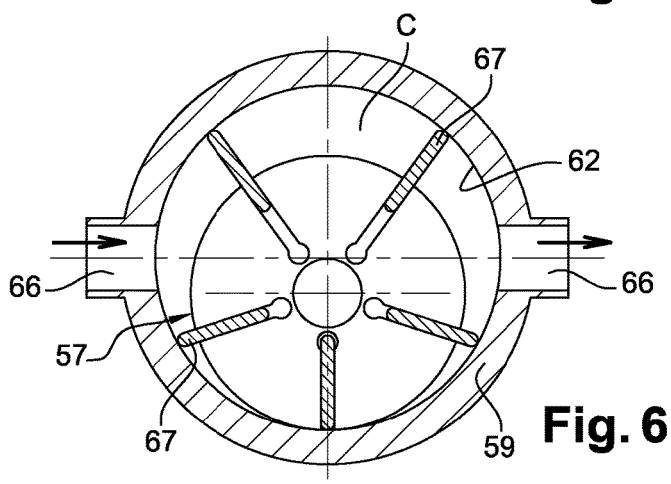

The shaft 42 supports at least one gerotor pinion 56 or one rotor having blades 57, a gerotor pinion 56 being shown in FIG. 5 and a rotor having blades 57 being shown in FIG. 6.

The pinion 56 is fixed to the shaft 42, coaxially therewith, the pinion 56 comprising for example a recess 56a in which a lug of the shaft 42 is engaged. The pinion 56 is movable in rotation in an internally toothed ring gear 58 which is itself movable in rotation in a pump structure 59 (FIG. 5). The ring gear 58 comprises a substantially cylindrical exterior surface 60 which co-operates with an internal cylindrical surface of the pump structure 59 which itself comprises an external cylindrical surface 61 which co-operates with an internal cylindrical surface of the pump casing 44, the reference 62 in FIG. 4 designating this cylindrical surface of the casing 44, which delimits a cavity C to receive the assembly of parts 56, 58, 59 of FIG. 5.

The ring gear 58 and the pump structure 59 comprise radial openings 63a, 63b for the passage of oil, the pump structure 59 also comprising a longitudinal through-bore 64. The pump casing 44 supports a rectilinear rod 65 which passes through the bore 64 of the pump structure 59 in order to lock it against rotation about the axis B of the cavity C and in order that the radial orifices 63b for the passage of oil in the pump structure 59 are aligned radially with radial orifices 66 for the passage of oil in the pump casing 44. Thus it will be understood that, in the illustrated example, the pump 30' has a radial oil supply and a radial oil outlet.

As a variant, a pump could be used having an axial oil supply and an axial oil outlet. The parts 56, 58, 59 would then be placed between two flanges comprising axial openings which communicate with axial orifices in the pump casing. The embodiment of FIG. 4 shows an eccentric pump where the eccentricity is produced by offsetting of the axis A with respect to the axis B which is the axis of the reduction gear formed by the pinion 46 and the ring gear 50. This embodiment makes it possible to produce a reduction of the movement by means of this small reduction gear, which creates the advantage of being easily adaptable depending on requirements. Another embodiment would be possible with the axis A aligned with the axis B of the reduction gear. The support structure 59 would then be formed by an eccentric. Thus a system would be provided which would take up less space but without reduction of the rotational speed.

The rotor having blades 57 of FIG. 6 is fixed to the shaft 42, coaxially therewith. It comprises radial recesses for housing and radially moving blades 67 of which the radially outer ends engage with the internal cylindrical surface 62 defining the cavity C of the pump structure 59 (FIGS. 4 and 6). In the example illustrated in FIG. 6, the pump also has a radial oil supply and a radial oil outlet.

In the case where the pump 30' comprises two or more gerotor pinions 56, each pinion can be separated from the other pinions by annular flanges (not shown) mounted in the cavity C and arranged on either side of the pinions 56. The rod 65 can then be used in order to lock all the pump structures 59 and pump flanges against rotation.

The coupling means 54 between the pump casing 44 and the fan shaft 4 comprise splines here. The means 51 for coupling the rotor of the pump to the LP shaft 3 are in this case of the knucklebone type and are intended to ensure a coupling between the ring gear 50 and the LP shaft 3 when the speed of this shaft is relatively low, which is the case during windmilling, and not to ensure this coupling when this speed is considerable, in normal operation of the turbojet engine. Of course, the pump 30' could be intended to lubricate the reduction gear 10 during the entire duration of operation of the turbojet engine, and not only in an emergency case of the windmilling type for example. In this case, the coupling means 51 could comprise splines.

The references 36 and 38 designate, respectively, the oil inlet and the oil outlet of the pump 30'. As described above, the reference 40 designates an oil pipe of which the upstream end is connected to the oil inlet 36 of the pump 30'. In the illustrated example, the ring gear 50 comprises a shaft portion 70 which is centred and guided in an opening of the pump casing 44, around the axis B, and which comprises an internal longitudinal passage 72 for circulation of oil. The downstream end of this passage 72 forms the oil inlet 36 of the pump and is connected to the pipe 40, and its upstream end opens into a chamber 74 in which the ring gear 50 and the pinion 46 are accommodated. Conduits 68 of the pump casing 41 ensure the conveying of oil from the chamber 74 to the cavity C.

Due to the difference in rotational speeds between the shafts 3 and 4, the operation of the pump 30' forces the passage of oil from the oil inlet 36 to the oil outlet 38 of the pump 30' (arrows 69).

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A turbine engine including two rotary shafts and a lubrication unit comprising at least one pump which comprises a casing inside of which a rotor is mounted and driven by one of said rotary shafts, the pump casing being rotated by the other of said rotary shafts such that the actuation of the pump depends on the difference between rotational speeds of the rotary shafts, wherein the rotary shafts are a drive shaft and a fan shaft, respectively, the fan shaft being driven by the drive shaft by an annular reduction gear which is lubricated by the lubrication unit, the pump axially passing through the reduction gear and the fan shaft, and wherein the casing of the pump is coupled by splines to the fan shaft and the rotor of the pump is coupled by splines or knucklebones to the drive shaft.

2. The turbine engine according to claim 1, wherein the rotary shafts are coaxial and the casing of the pump is mounted coaxially with the shafts.

3. The turbine engine according to claim 1, wherein the rotor of the pump is driven by the drive shaft by a ring gear with internal or external toothing.

4. The turbine engine according to claim 1, wherein the pump has blades or a gerotor.

5. The turbine engine according to claim 4, the rotor of the pump comprises a pump shaft which supports:

at least one internal gerotor pinion engaging with an internally toothed ring gear which is movable in rotation in the casing of the pump, or at least one rotor with blades engaging with the casing of the pump.

6. The turbine engine according to claim 5, wherein the axis of rotation of the pump shaft is fixed within a reference system of the casing of the pump.

7. The turbine engine according to claim 1, wherein the pump has an elongated shape.

8. A torque transmission system for a turbine engine, including two rotary shafts coupled together by a reduction gear having an epicyclic gear train, the system further comprising a lubrication unit comprising at least one pump which comprises a casing inside of which a rotor is mounted and driven by one of said rotary shafts, the pump casing being rotated by the other of said rotary shafts such that the actuation of the pump depends on the difference between rotational speeds of the rotary shafts, wherein the rotary shafts are a drive shaft and a fan shaft, respectively, the fan shaft being driven by the drive shaft by an annular reduction gear which is lubricated by the lubrication unit, the pump axially passing through the reduction gear and the fan shaft, and wherein the casing of the pump is coupled to the fan shaft, and the rotor of the pump is coupled to the drive shaft.

* * * * *